May 11, 1965 M. E. SIKORSKI 3,182,492

STABILIZED TUNNEL DIODE STRESS SENSING DEVICES

Filed Oct. 4, 1962 3 Sheets-Sheet 1

INVENTOR
M. E. SIKORSKI
BY
H. O. Wright
ATTORNEY

STABILIZED TUNNEL DIODE STRESS SENSING DEVICES

Filed Oct. 4, 1962 3 Sheets-Sheet 2

INVENTOR
M. E. SIKORSKI
BY H. O. Wright
ATTORNEY

STABILIZED TUNNEL DIODE STRESS SENSING DEVICES

Filed Oct. 4, 1962 3 Sheets-Sheet 3

INVENTOR
M. E. SIKORSKI
BY
H. O. Wright
ATTORNEY

United States Patent Office 3,182,492 Patented May 11, 1965

3,182,492
STABILIZED TUNNEL DIODE STRESS SENSING DEVICES

Mathew E. Sikorski, New Providence, N.J., assignor to Bell Telephone Laboratories, Incorporated, New York, N.Y., a corporation of New York Filed Oct. 4, 1962, Ser. No. 228,355
2 Claims. (Cl. 73—88.5)

This invention relates to stress-sensing devices. More particularly, it relates to stress-sensing devices which employ tunnel diodes.

The tunnel diode, known as the Esaki diode since it was invented by Leo Esaki several years ago (see article in The Physical Review, volume 108, 1958, page 603) is discussed, for example, by George C. Dacey in the Bell Laboratories Record published April 1961, pages 122 through 125. The most significant feature of the tunnel diode is, of course, that its forward characteristic includes a negative resistance portion and the principal types of operation heretofore proposed have sought to employ the negative resistance portion of the characteristic for apparatus such as oscillators and amplifiers or for large signal switching arrangements under particular conditions.

More recently, it has been discovered that the p-n junctions of tunnel diodes have a high degree of sensitivity to stress both hydrostatic and uniaxial. This phenomenon and some uses thereof are disclosed in applicant's copending applications, Serial No. 104,994 filed April 24, 1961, and Serial No. 228,354, filed October 4, 1962, concurrently with the present application. Insofar as they are pertinent, these applications are hereby incorporated by reference as an integral portion of the disclosure of the present application. Of interest also are the copending application Serial No. 28,047 filed May 10, 1960, by W. G. Pfann assigned to applicant's assignee, which matured as Patent No. 3,065,636, granted November 27, 1962, and Patent 3,009,126 granted November 14, 1961, to W. G. Pfann.

As noted in applicant's above mentioned concurrently filed, copending application, the p-n junctions of tunnel diodes made on wafers of the semiconductive material gallium antimonide have unusually high sensitivity to imposed stresses of both the hydrostatic and uniaxial types and hence are of particular interest for use in stress-sensing devices, such as strain gauges, phonograph pickups, microphones and the like.

As is further noted in applicant's above mentioned concurrently filed, copending application, tunnel diodes are readily produced by numerous methods several of which are specifically described in that application.

The said concurrently filed application further discloses that diodes made by inducing a p-n tunnel junction on a wafer of p-type semiconductive material may differ in a number of significant respects from those made by inducing a p-n tunnel junction on an n-type wafer of the same kind of semiconductive material.

The present application is based upon applicant's discovery that in the case of a number of semiconductive materials for which tunnel diode junctions are stress sensitive, not only does the maximum current amplitude of the first positive portion of the forwardly biased, current-voltage characteristic change with applied stress but also the voltage at which this maximum current amplitude is obtained may be appreciably different from the voltage at which maximum current is obtained with no applied stress. Since it is desirable in many instances that the ratio of maximum current with no stress to the maximum current with a specified stress be determined, it is obviously awkward and less convenient for making stress measurements to have these maximum current values occur at different values of bias voltage than it would be if they occurred at the same bias voltage.

Applicant has further discovered that in the case of gallium antimonide, which, as noted above, has an unusually pronounced sensitivity to applied stress, for a tunnel diode junction formed on a p-type wafer of gallium antimonide the voltage bias for maximum current under a prescribed stress decreases with respect to the voltage bias for no stress but that for a tunnel diode junction formed on an n-type wafer of gallium antimonide the voltage bias for maximum current under the said prescribed stress increases with respect to the voltage bias for no stress. Accordingly, by employing one "p-type" tunnel diode and one "n-type" tunnel diode, both of gallium antimonide, and connecting them electrically in parallel the voltage bias for the maximum current when both diodes are subjected to the same stress can be made to occur at the same value of bias voltage at which maximum current is obtained when no stress is impressed upon the diodes.

Applicant has further discovered that a pair of tunnel diodes of gallium antimonide, arranged as above described to maintain the same voltage bias for maximum current under stress as under no stress, are also self compensating with respect to changes in temperature since p-type diodes of gallium antimonide have a current-voltage characteristic which decreases in maximum amplitude with increasing temperature, while n-type diodes of gallium antimonide have a corresponding characteristic which increases in maximum amplitude with increasing temperature.

It is accordingly a principal object of the invention to increase the stability with changes in stress and temperature of stress-sensing devices employing tunnel diodes of gallium antimonide.

Other and further objects, features and advantages of the invention will become apparent from a perusal of the following detailed description of illustrative structures embodying the principles of the invention taken together with the accompanying drawing, in which.

Like details occurring in two or more figures are given the same designation numbers in each figure.

Figure 1:
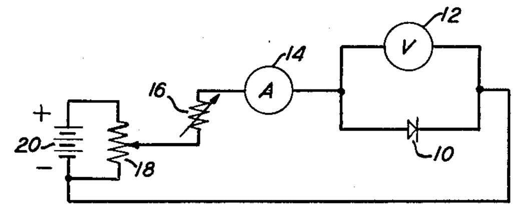
FIG. 1 illustrates in schematic diagram form an electrical circuit for determining the current-voltage characteristic of a tunnel diode.

In more detail in FIG. 1, a source of direct current potential 20 has shunted across it a potentiometer 18 by adjustment of which any voltage from zero to the maximum voltage of source 20 can be selected.

A variable resistance 16 affords control of the current in the circuit and ammeter 14 provides an indication of the current flowing at any instant.

A tunnel diode 10 with a voltmeter 12 shunted across it to provide an indication of the voltage across the diode at any instant is connected in series with variable resistance 16, ammeter 14 and the portion of potentiometer 18 selected by the adjustable contacting arm of the potentiometer.

Obviously, the circuit of FIG. 1 permits the determination of the current-voltage characteristic of the diode 10.

Figure 2:
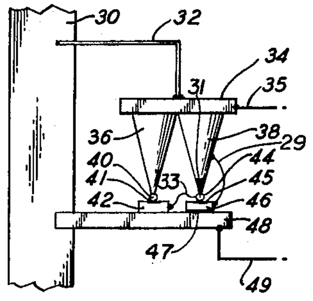
FIG. 2 illustrates one method of employing two tunnel diodes in a stress-sensing arrangement.

In FIG. 2 a strain gauge arrangement of the invention is illustrated and comprises the following:

A first tunnel diode of p-type gallium antimonide comprising, for example, a wafer 42 containing as an impurity approximately $2 \times 10^{19}$ parts per cubic centimeter of zinc. A tunnel junction 41 can be formed on the upper surface of wafer 42 by fusing a ball 40 of silver containing substantially two percent of tellurium to the wafer at a temperature of 675° C. or slightly higher until alloying is observed after which the temperature is rapidly reduced to room temperature.

A second tunnel diode of n-type gallium antimonide comprising, for example, a wafer 46 containing as an impurity approximately $10^{18}$ parts per cubic centimeter of tellurium. A tunnel junction 45 can be formed on the upper surface of wafer 46 by fusing a ball 44 of cadmium containing substantially five percent of gold to the wafer at a temperature of 650° C. or slightly higher until alloying is observed after which the temperature is rapidly reduced to room temperature. These temperature cycles are usually effected automatically, the mechanism being arranged to carry the temperature above that noted for only a small fraction of a second.

As stated in my above mentioned concurrently filed, copending application, rapid cooling is advisable lest a junction too thick to permit "quantum mechanical tunneling" should be formed. Also said application discloses a number of other ways of making tunnel diodes. Should an unduly thick junction be formed, the device would of course not have the characteristics of a tunnel diode but those of a conventional semiconductor diode.

Wafers 42 and 46 are mounted on a base 48 which is of conductive material and makes ohmic contact to the lower surface of wafer 42 but is electrically insulated from wafer 46 by a layer 47 of insulating material such for example as a thin layer of a nonconductive adhesive material. Electrical connection can then be made through lead 49 to wafer 42 and through lead 33 to ball 44.

Tapered electrically conductive member 36 makes mechanical and electrical contact with ball 40. Tapered member 38 is of conductive material except for its tip portion 31 which is of a hard insulating material such as diamond. Wafer 46 may then be electrically connected to the conductive portion of member 38 as by a lead 29. The upper ends of members 36 and 38 are held securely by electrically conductive block 34. Electrical connection to the respective opposite sides of the tunnel junctions 41 and 45 can then be made through lead 35.

Figure 4:
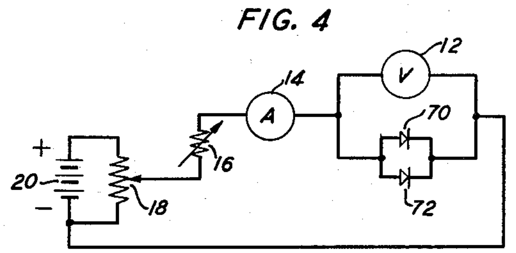
FIG. 4 illustrates in schematic diagram form an electrical circuit for determining the current-voltage characteristic of two tunnel diodes connected electrically in parallel.

If member 48 is rigidly attached to a member 30, the strain in which it is desired to determine, and a resilient member 32 is also rigidly attached to member 30 at an appropriate distance from the point of attachment of member 48, the right end of member 32 being also rigidly attached to member 34, then strain in member 30 will result in a stress being imposed upon the tunnel junctions 41 and 45 and the magnitude of the strain can be determined from the change in the current-voltage characteristics of the junctions which are obviously connected electrically in parallel, an appropriate electrical circuit being that shown in schematic diagram form in FIG. 4 which circuit will be described in more detail hereinunder.

If the stress imposed on junctions 41 and 45 varies periodically at an appreciable frequency, the tapered members 36 and 38 will function as mechanical transformers, as taught, for example, in Patent 2,573,168, granted October 30, 1951, to W. P. Mason and R. F. Wick, to produce a substantial "stepup" of the stress applied, thus increasing the sensitivity of the junctions to the applied stress.

Figure 3:
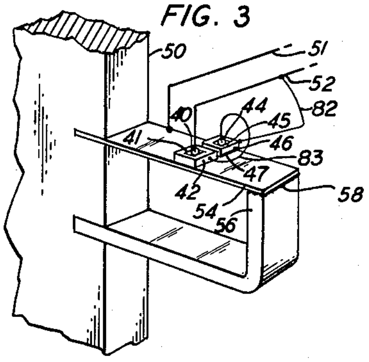
FIG. 3 illustrates another method of employing two tunnel diodes in a stress-sensing arrangement.

In FIG. 3 a second strain gauge arrangement of the invention is illustrated and differs principally from that of FIG. 2, described immediately above, in that the tunnel diodes 41, 42 and 45, 46 are mounted on a resilient member or spring 58, the left end of spring 58 being rigidly attached to a member 50 the strain in which is to be determined. A second rigid member 56 mechanically connects the right end of spring 58 to a second point on member 50 appropriately spaced from the point of attachment of the right end of spring 58 so that strain in member 50 imposes a stress on the tunnel diodes in that expansion in member 50 will tend to bend spring 58 downwardly and contraction in member 50 will tend to bend spring 58 upwardly. In the first case the tunnel diodes will be subjected to uniaxial transverse tensile stress and in the second case the tunnel diodes will be subjected to uniaxial transverse compressive stress. As is discussed at length in my above mentioned concurrently filed copending applications, a uniaxial transverse tensile stress is equivalent to a uniaxial compressive stress applied perpendicularly to the junction and similarly a uniaxial transverse compressive stress is equivalent to a uniaxial tensile stress applied perpendicularly to the junction.

Electrical lead 52 affords electrical connection to ball 40 and via lead 82 to wafer 46. Lead 51 makes electrical connection through spring member 58 to wafer 42 and via lead 83 to ball 44. Wafer 46 has layer of insulating material 47 insulating it from spring member 58. The wafers 42, 46, junctions 41, 45, and balls 40, 44 can be as described above in connection with FIG. 2.

In the circuit of FIG. 4 the sole difference from the circuit of FIG. 1 described in detail above is, obviously, that two tunnel diodes 70, 72 connected electrically in parallel are substituted for the single tunnel diode 10 of FIG. 1. Thus the combined characteristics of the two tunnel diodes 40, 41, 42 and 44, 45, 46 connected electrically in parallel as shown in FIGS. 2 and 3 (that is, the current-voltage characteristics) can be determined by use of a circuit as represented by the schematic diagram of FIG. 4.

Figure 5:
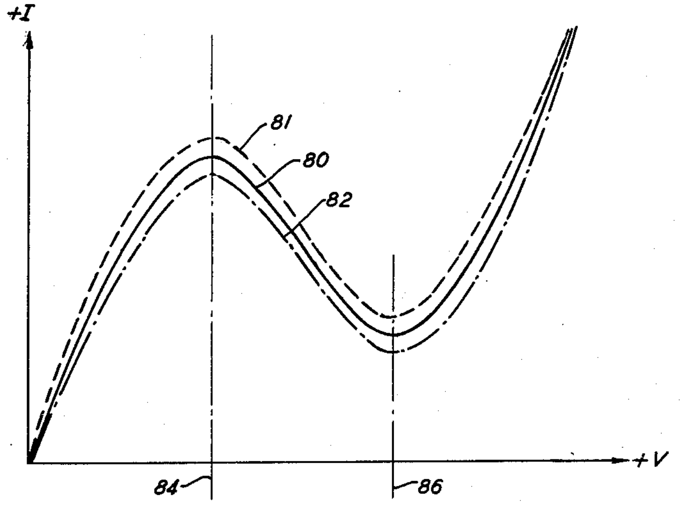
FIG. 5 illustrates the respective responses of two appropriately fabricated tunnel diodes of gallium antimonide to the same change in temperature.

In FIG. 5 a solid line characteristic 80 having a peak at line 84 and a valley at line 86 substantially represents the current-voltage characteristic of either of the tunnel diodes 40, 41, 42 or 44, 45, 46 of FIGS. 2 and 3 taken one diode at a time as indicated in FIG. 1, the tests being taken at room temperature and with no stress imposed upon the tunnel diode junctions.

If, however, the temperature is raised appreciably, the tunnel diode formed on the p-type wafer 42 will have a perceptibly lower current-voltage characteristic as represented, for example, by the dash-line characteristic 82 and the other tunnel diode formed on the n-type wafer 46 will have a correspondingly higher current-voltage characteristic as represented, for example, by the dotted line characteristic 81.

When the two diodes are connected electrically in parallel therefore their current-voltage characteristics are added and temperature changes will produce substantially no change in the characteristic of the combination. Curve 160 of FIG. 8, for example, represents the combined characteristics of two such diodes with no stress imposed on the diodes and is substantially unvarying with temperature changes.

Figure 6:
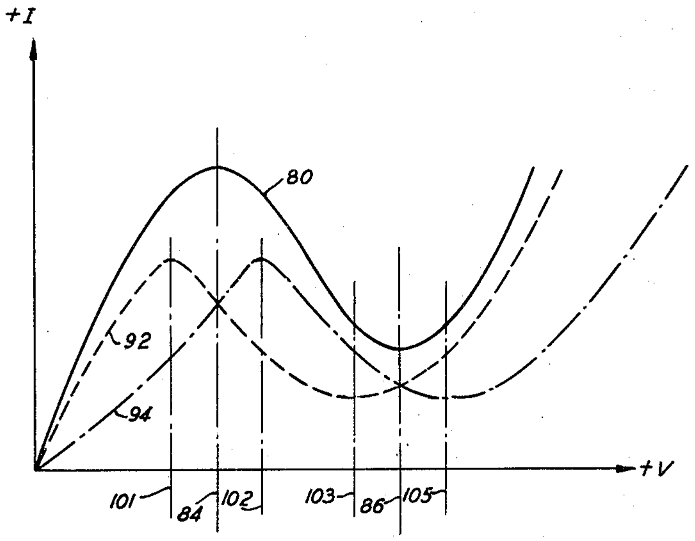
FIG. 6 illustrates the respective responses of two appropriately fabricated tunnel diodes of gallium antimonide to a first specific change in stress on each diode.

In FIG. 6 solid line characteristic 80 again substantially represents the current-voltage characteristic of either of the tunnel diodes of FIGS. 2 and 3 taken one diode at a time, at room temperature with no stress imposed on the diode.

If a specific compressive stress is imposed upon each diode, however, the characteristic 92 of the diode having the p-type wafer 42 will not only have a lower maximum amplitude than the characteristic 80 but its peak current value will occur at line 101, that is, at a lower value of voltage and its valley will occur at line 103 also a lower value of voltage than for the corresponding features of characteristic 80. Conversely, for the other diode the characteristic 94 will be of similar height with characteristic 92 but its peak will occur at line 102 and its valley will occur at line 105 which are at voltages above those for the corresponding features of characteristic 80 by substantially the same amounts as the corresponding features of the first diode were below those of characteristic 80.

Figure 7:
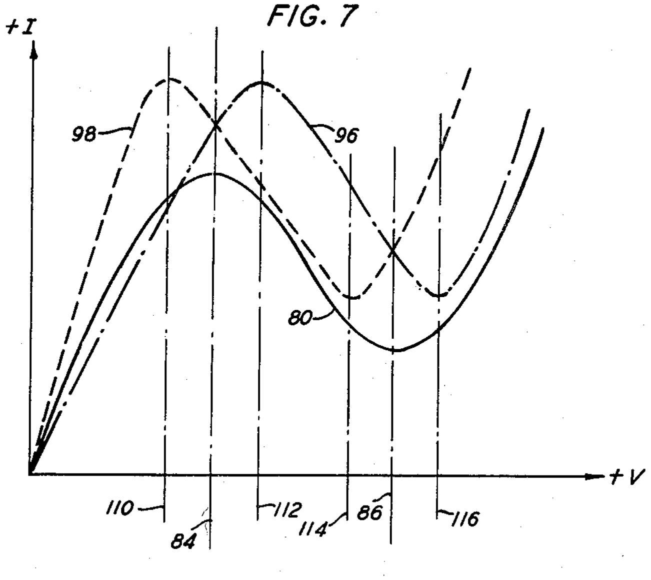
FIG. 7 illustrates the respective responses of two appropriately fabricated tunnel diodes of gallium antimonide to a second specific change in stress on each diode.

Similarly, in FIG. 7, under a tensile stress the tunnel diode having the p-type wafer 42 will have characteristic 96 having a higher peak than for characteristic 80 but with its peak and valley at lines 112 and 116 respectively, that is, at higher voltages than for the corresponding features of characteristic 80. Conversely, for the other diode the characteristic 98 will have a higher peak than for characteristic 80 but with its peak and valley at lines 110 and 114, respectively, that is, at lower voltages than for the corresponding features of characteristic 80.

Figure 8:
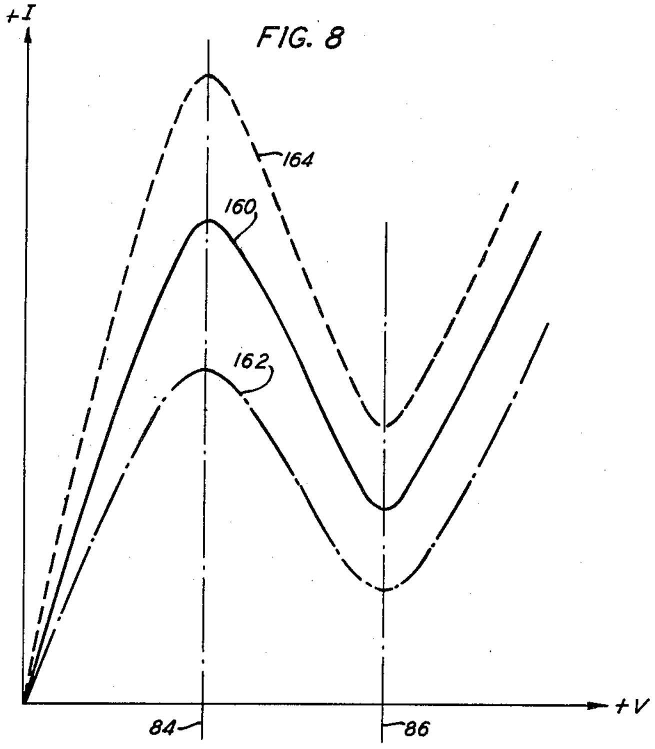
FIG. 8 illustrates the combined responses of two appropriately fabricated tunnel diodes of gallium antimonide to the first and second above mentioned specific changes in stress.

The combined characteristics of the two diodes in parallel are shown in FIG. 8, characteristic 160 being, as mentioned above, their combined characteristic under no stress, characteristic 162 being their combined characteristics under a specific compressive stress and characteristic 164 being their combined characteristics under a specific tensile stress.

Numerous and varied modifications and rearrangements within the spirit and scope of the principles of the invention will readily occur to those skilled in the art.

No attempt to exhaustively illustrate all such possibilities has been made.

What is claimed is:

1. In combination, a first tunnel diode formed on a p-type wafer of a semiconductive material, a second tunnel diode formed on an n-type wafer of the same semiconductive material, the diodes being connected electrically in parallel, means for biasing said tunnel diodes to substantially the voltage below the negative resistance region of said diodes at which the current through them becomes a maximum, means for subjecting both of said tunnel diodes to a specific stress, and means for determining the change in the current through the diodes resulting from the application of the stress.

2. The combination of claim 1 in which the tunnel diode wafers are of gallium antimonide.

References Cited by the Examiner

UNITED STATES PATENTS

| | | | |
|---|---|---|---|
| 2,632,062 | 3/53 | Montgomery | 73—88.5 |
| 2,929,885 | 3/60 | Mueller | 73—88.5 |

OTHER REFERENCES

Esaki et al.: "A New Device Using the Tunneling Process in Narrow p-n Junctions," Solid State Electronics, vol. 1, March 1960, pages 13, 14 and 15.

Rogers, Edward S.: "Experimental Tunnel-Diode Electro-mechanical Transducer Elements and Their Use in Tunnel-Diode Microphones," The Journal of the Acoustical Society of America, vol. 34, No. 7, July 1962, pages 883 to 893.

RICHARD C. QUEISSER, *Primary Examiner.*